United States Patent [19]
Singh

[11] Patent Number: 5,917,722
[45] Date of Patent: Jun. 29, 1999

[54] CONTROLLED COMMUTATOR CIRCUIT

[75] Inventor: Steve Sevak Singh, Sussex, United Kingdom

[73] Assignees: B&W Loudspeakers Ltd., West Sussex; University of Brighton, Sussex, both of United Kingdom

[21] Appl. No.: 08/737,345
[22] PCT Filed: May 10, 1995
[86] PCT No.: PCT/GB95/01055
  § 371 Date: Jan. 23, 1997
  § 102(e) Date: Jan. 23, 1997
[87] PCT Pub. No.: WO95/31853
  PCT Pub. Date: Nov. 23, 1995

[30]   Foreign Application Priority Data

May 11, 1994 [GB] United Kingdom ............... 9409364
Jul. 12, 1994 [GB] United Kingdom ............... 9414074

[51] Int. Cl.⁶ ............................................. H02M 7/5387
[52] U.S. Cl. ........................................................ 363/132
[58] Field of Search ............................ 363/16, 17, 97, 363/98, 131, 132

[56]   References Cited
U.S. PATENT DOCUMENTS 4,639,849 1/1987 Noworolski et al. ................. 363/56
4,833,584 5/1989 Divan ................................... 363/37
4,855,888 8/1989 Henze et al. ......................... 363/17
5,047,913 9/1991 De Doncker et al. ............... 363/95
5,563,775 10/1996 Kammiller ........................... 363/98
5,594,635 1/1997 Gegner ............................... 363/132

OTHER PUBLICATIONS

"A Novel Low–loss Switching Method for Converters Using Turn–off Power Switches (IGBTs, GTOs etc.)", by L.L. Erhartt et al., *Fifth European Conference On Power Electronics And Applications*, Sep. 13, 1993, pp. 46–51.

"A Three–Phase Soft–Switched High Power Density DC/DC Converter for High Power Applications, " by R.W. De Doncker et al., *IEEE Industry Applications Society Annual Meeting, Pittsburgh*, Oct. 2, 1988, No. Part 1, pp. 796–805.

*Primary Examiner*—Matthew Nguyen
*Attorney, Agent, or Firm*—Sughrue, Mion, Zinn, Macpeak & Seas, PLLC

[57]   ABSTRACT

A commutator circuit includes a bridge (1), which may have a half-bridge or a full-bridge topology, and a switch resonant arm (3, L, C). The resonant arm is coupled to the midpoint of the bridge, directly, or via a current buffer, or via a transformer. The arm provide controlled resonant commutation of a load coupled to the midpoint of the bridge. The circuit may be used, for example to drive an electric servo motor, or in a digital audio power amplifier.

23 Claims, 19 Drawing Sheets

V voltage source         S1,S2,S3 switches
L resonant inductor      C resonant capacitor V voltage source    C1,C2 capacitors
S1,S2,S3 switches   L resonant inductor
C resonant capacitor V voltage source    C1,C2 capacitors
S1,S2,S3 switches   L resonant inductor
C resonant capacitor  B buffer V voltage source    S1,S2,S3 switches
L resonant inductor    C resonant capacitor V voltage source
S1,S2,S3 switches
C resonant capacitors C1,C2 capacitors
L resonant inductors V voltage source
S1,S2,S3 switches
C resonant capacitors C1,C2 capacitors
L resonant inductors

CONTROLLED COMMUTATOR CIRCUIT

BACKGROUND TO THE INVENTION

The present invention relates to a commutator circuit for coupling power to a load, and in particular to a circuit suitable for use in a digital power amplifier. The present invention is not however limited in this respect, and the circuit may find use in a variety of different fields.

A commutator used, for example, in a digital power amplifier may be required to switch at high frequencies and relatively high power levels. This combination tends to result in the production of high levels of electromagnetic interference (EMI). In consequence, much effort has to be directed to limiting the EMI generated by any device incorporating such a commutator circuit so as to meet the increasingly stringent statutory limitations on EMI. Conventionally, it has been necessary, for example, to provide extensive shielding around the circuits and to tailor the physical layout of the circuits to minimise the EMI from the device as a whole.

SUMMARY OF THE INVENTION

According to a first aspect of the present invention a commutator circuit including a commutator bridge having switches in each arm of the bridge and arranged to have a load coupled to a mid-point of the bridge is characterised by a switched resonant arm also coupled to the mid-point of the bridge and arranged to provide controlled resonant commutation of the load.

In the context of the present specification, the term "bridge" encompasses both full and half-bridge topologies. The term "coupling" as used in the present specification encompasses connection via a current buffer and transformer-coupling as well as direct electrical connection.

The present invention adopts a radically different approach to the problem of EMI. Instead of using a commutator circuit which generates high levels of EMI, and then relying upon appropriate shielding, the present invention uses a modified commutator configuration with resonant control of the voltage switching. This allows precise control over the shape of the leading and trailing edges of the switched waveform and so allows the EMI to be eliminated or reduced at source. The topology enables well defined commutation rates for high current or high energy carrying loads and the consequent delivery of high resolution pulse energy shapes to the load. As well as being of value in limiting EMI, circuits embodying the present invention are also particularly advantageous where it is necessary to drive a complex load, such as inductive, capacitive or inductive plus capacitive combinations. Such loads occur, for example, in motor windings, magnetic windings, transformers, inductors and the like. In circuits embodying the invention, the timing of the commutator switches and the resonant arm switch can be controlled independently of the time-constant characteristic of the resonant components, for example by a PWM signal derived from an audio waveform.

The circuits of the present invention may be particularly advantageous in motor servo drives in which precision power delivery to the motor is required. The circuit when driving a complex load such as a motor can use simple PWM as a method of control and stability. This is by contrast with conventional circuit topologies using resonant elements. The use of the topologies of the present invention with PWM control can result in faster response times.

The commutation rates (rate of change of voltage) experienced in the power leads connecting a drive circuit to a complex impedance load are determined by the component values in the drive circuit. This provides a predictable method of controlling commutation rates so as to keep them to a minimum thereby limiting EM radiation. As a consequence of this reduction in the radiation from the leads connecting the drive circuit to the load the distance between the load and the drive circuit can be increased whilst still avoiding interference problems.

Preferably the resonant arm is connected to a potential having a value of substantially V/2, where V is the drive potential across the bridge.

The potential at V/2 may possibly, but not necessarily, be provided by the common mid-point of a pair of capacitors connected across the voltage source, as detailed below. Alternatively, in other circuits embodying the invention a three-rail power supply might be used with the potential at V/2 being provided by the middle rail.

Preferably the commutator circuit includes a pair of capacitors (C1, C2) coupled in series with respect to each other and in parallel across respective switches in the arms of the bridge and the switched resonant arm is coupled between the common mid-point of the two capacitors, and the said mid-point of the bridge. Preferably the resonant arm comprises a LC circuit. Preferably the switch in the switched resonant arm is coupled in series with the inductor L of the LC circuit, and more preferably the switch has one pole coupled to the said potential value substantially V/2, and the other pole coupled to the inductor.

This particular arrangement of the inductor L and the switch has the advantage that the pole of the switch can be coupled to a stable reference voltage, and so the operating voltage of the switch remains constant through the commutation cycle.

When the reference voltage at V/2 is provided by the mid-point of a pair of capacitors, then preferably the inductor L is connected in series via the switch to the mid-point of the pair of capacitors and the capacitor C connected in parallel with one of the switches S2 in the arms of the bridge.

Preferably a current buffer is coupled between the switched resonant arm and the mid-point of the bridge. This current buffer may comprise, for example, an operational amplifier.

Advantageously, the load may be transformer-coupled to the bridge. Preferably the load is coupled via a transformer having at least three windings including a primary winding connected to the resonant arm and a secondary winding connected to the load. Preferably the ratio of the number of turns on the said primary winding to the said secondary winding is m:n where m and n are positive integers and m is greater than n.

The use of transformer-coupling makes it possible to isolate the load from the commutator circuit and means that if desired the load can be maintained at a reference voltage, for example it may be grounded. Where a three winding transformer with a winding ratio of m:n is used, then any current reflected from the load back into the primary circuit is reduced by a ratio of n/m.

Where the bridge has a full-bridge topology, then it may include at least two resonant arms, one coupled to each side of the bridge. In general this arrangement provides greatest flexibility in operation and optimum performance in terms of control over the output drive characteristics. However in some uses it may be desirable to reduce the component-count of the circuit, and here advantageously the circuit may use a resonant arm coupled across the bridge, that is with one end connected to each side of the bridge at the respective mid-points. As a further alternative the circuit may still use two resonant arms, but with at least one resonant element common to the at least two resonant arms.

Preferably a snubber network acts on the switch of the or each switched resonant arm.

As noted above, circuits embodying the present invention are particularly valuable, for example, as a rive circuit for an electric motor, or in a digital power amplifier. In the case of audio digital power amplifiers, the ability of the circuit to deliver a drive waveform of precisely controlled energy produces reduced levels of audio distortion. The present invention encompasses such drive circuits for electric motors and digital power amplifiers including commutator circuits in accordance with the first aspect of the present invention.

According to a second aspect of the present invention there is provided a method of operating a commutator circuit including a commutator bridge having switches in each arm of the bridge and arranged to have a load coupled to a mid-point of the bridge, characterised by switching a resonant arm also coupled to the mid-point of the bridge in synchronism with the switches in the arms of the bridge and thereby resonantly controlling the commutation of the voltage of the mid-point of the bridge.

DESCRIPTION OF THE DRAWINGS

Other aspects of the present invention will become apparent from the description below of preferred examples of the present invention with reference to the accompanying drawings in which:

FIG. 24 is a plot of output current and voltage waveforms for the circuit of FIG. 10a.

DESCRIPTION OF EXAMPLES

In a first example, a half-bridge commutator circuit 1 (FIG. 1a) is connected to a load 2. The load 2 is connected to a node N at the mid-point between the two arms of the commutator half-bridge. A further resonant arm 3 is connected to the mid-point of the bridge and via a switch S3 to the mid-point of two capacitors C1, C2 connected in parallel with the commutator switches S1, S2.

As described in further detail below, the circuit provides controlled quasi-resonant commutation. This is particularly useful in applications requiring drive to complex loads such as inductive, capacitive or inductive plus capacitive combination (e.g. motor windings, magnetic windings, transformers, inductors . . . etc.), in which controlled commutation is to be achieved. This topology enables well defined commutation rates for high current or high energy carrying loads. Consequently high resolution pulse energy shapes may be delivered to the load. The circuit may be used in a digital power amplifier to provide a variable duty cycle pulse width modulated audio waveform having edges which rise and fall resonantly. The timing of the operation of the switches is then controlled by the audio waveform being amplified.

Figure 4:
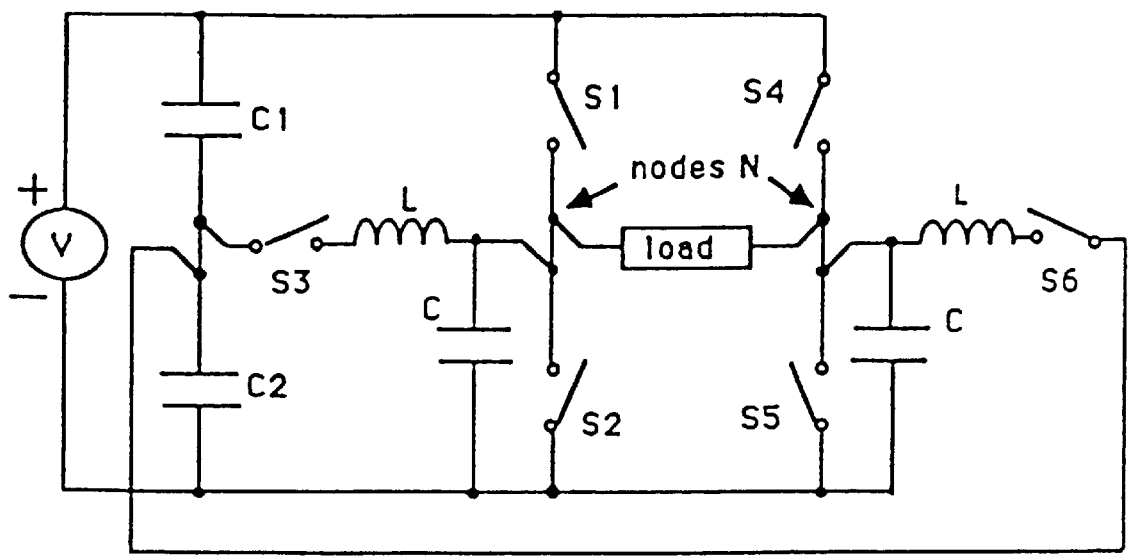
FIG. 4 is a first example of a full-bridge commutator.
Figure 5:
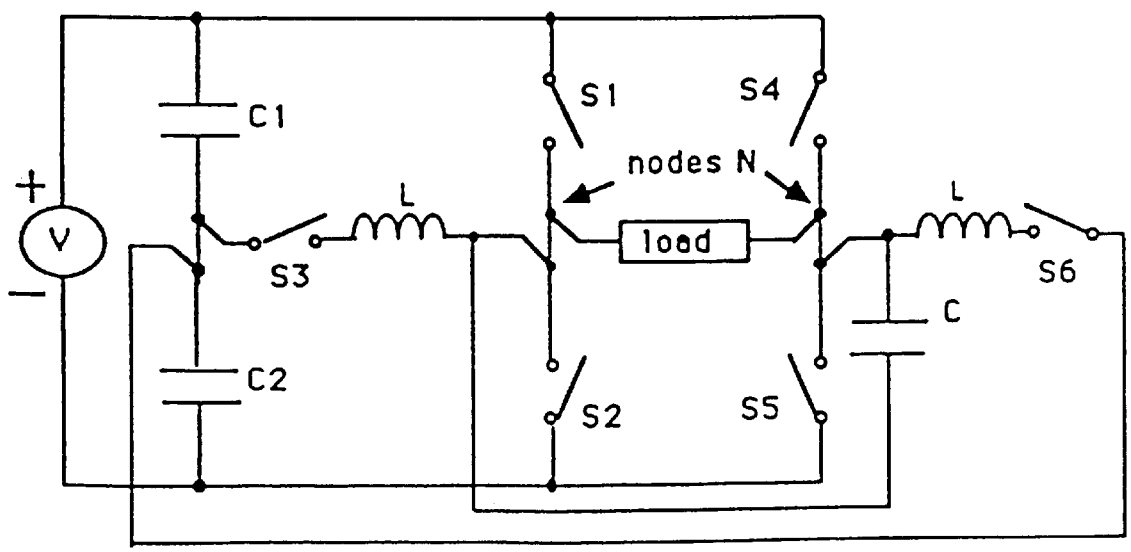
FIG. 5 is a second example of a full-bridge commutator.

Controlled commutation is especially of value in limiting EMI (Electromagnetic Interference) and enabling EMC (Electromagnetic Compliance). The diagram in FIG. 1a shows the basic topology from which more complicated resonantly controlled commutating topologies may be derived e.g FIGS. 4 and 5 depict the resonantly controlled commutating full bridge drive.

Figure 1A:
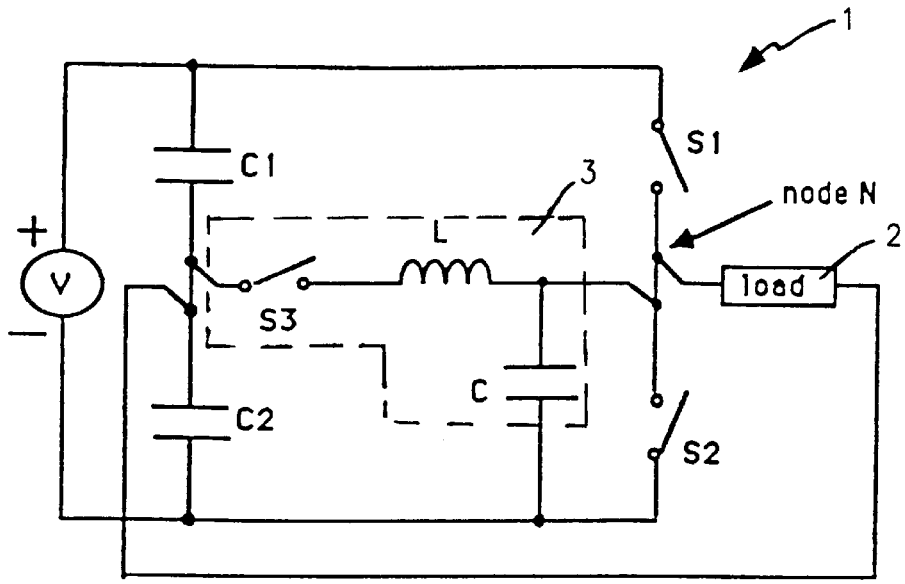
FIGS. 1a & 1b is a circuit diagram of a half-bridge commutator.
Figure 1B:
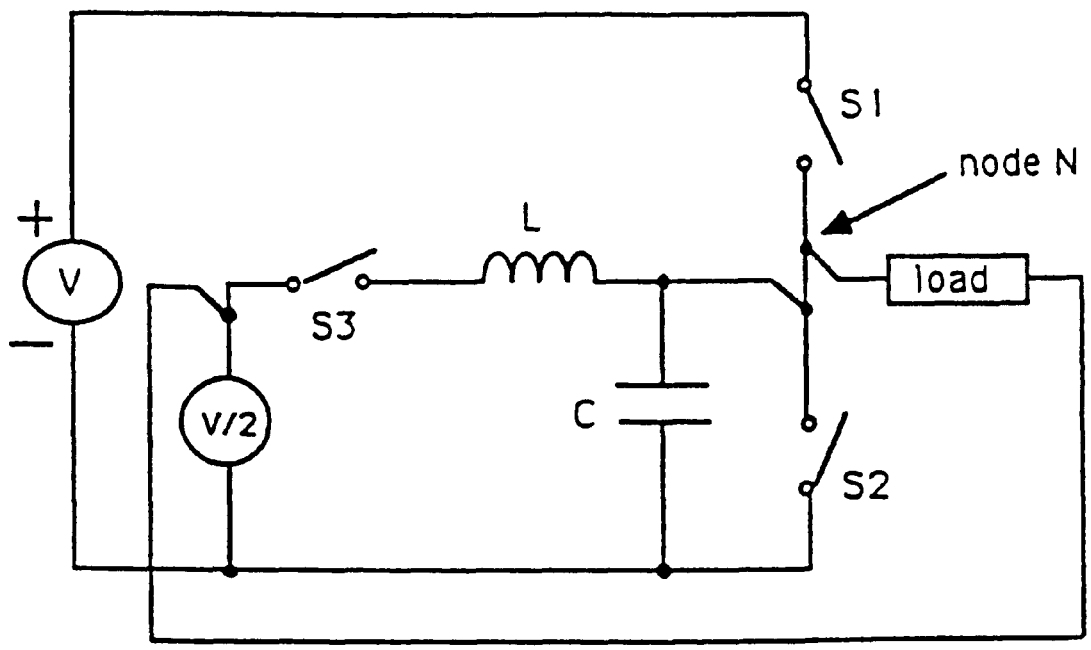

In FIG. 1a the voltage source may be a dc power supply (although not necessarily so) and the capacitors C1 and C2 provide a potential at their common connection which is approximately half that of the voltage source. In a practical implementation both C1 and C2 may have resistors in parallel in order to maintain equal voltages across each capacitor. In addition the common connection between C1 and C2 may be at any potential including ground in which case the load is effectively driven from a bipolar voltage source. Alternatively, as shown in FIG. 1b, a third rail or an additional voltage source at V/2 may be provided to drive the resonant arm.

The switches may be, e.g., bipolar, MOS, IGBT, thyristors or any other form of semiconductor switch. In fact they may be any form of high or low current switch including relays. The resonant capacitance C may dominate the parasitic capacitance of the switches S1 and S2, or may be equal to or part of this stray capacitance. Also, the capacitance C may be placed across S1 rather than S2.

The function of this basic topology is fully defined by the following four modes of behaviour. In any particular mode only one of the three switches are closed. Furthermore simultaneous operation of the switches is assumed, when moving from one mode to another.

Mode 1
S1 closed, S2 open, S3 open

In this mode the capacitor C1 supported by the voltage source v drive the load. The node N is maintained at the voltage +V through the direct connection of S1.

Mode 2
S1 open, S2 open, S3 closed

Figure 2:
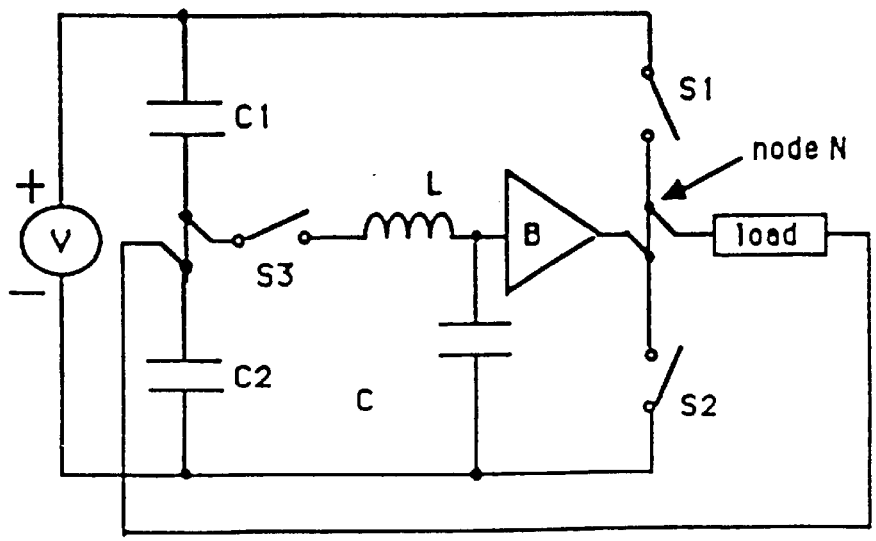
FIG. 2 is a modified version of the embodiment of FIG. 1.

In this mode the node N undergoes controlled resonant commutation. The resonant time constant is determined by the values of C and L. During this interval departure from true resonant behaviour may occur due to load current contribution at node N. However 'true' resonant behaviour may be achieved through the introduction of a current buffer as depicted in FIG. 2.

Mode 3
S1 open, S2 closed, S3 open

Mode 3 begins after the voltage at node N has changed such that the voltage across S2 is zero or close to zero volts, and S2 is then closed simultaneously as S3 is opened. The switch S2 is thus zero-voltage switched and the switch 53 may be zero-current switched. Throughout mode 3 the capacitor C2 supported by the voltage source V drives the load. The node N is maintained at the voltage −V through the direct connection of S2.

Mode 4
S1 open, S2 open, S3 closed

Figure 3:
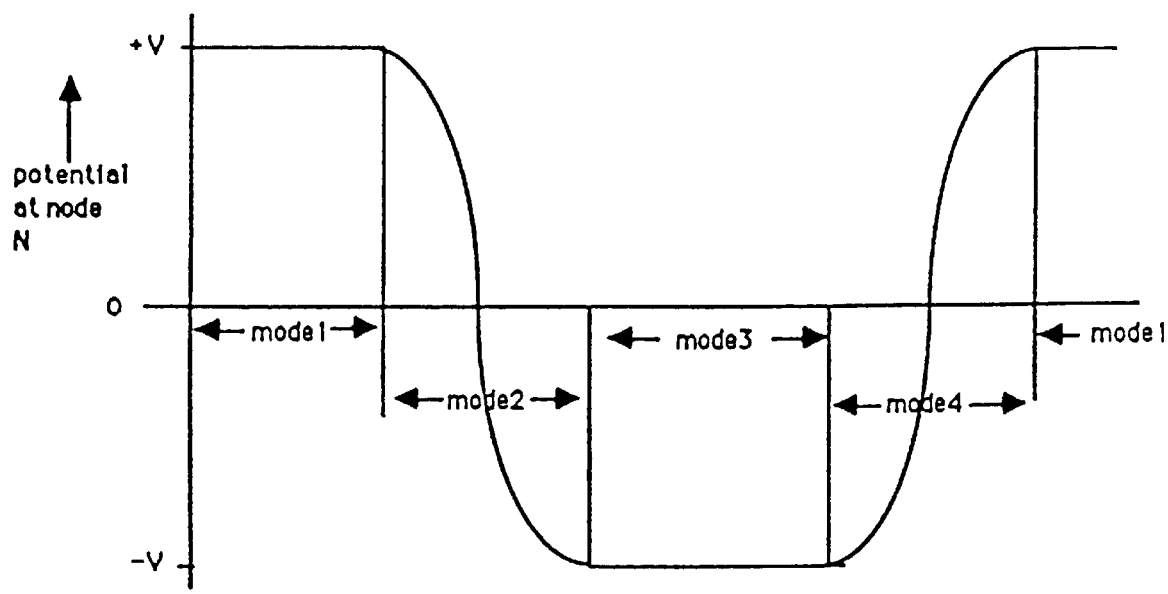
FIG. 3 is a graph illustrating the voltage waveform produced by the circuits of FIGS. 1 and 2.

This the final mode begins with the above switch arrangement: S1 open, S2 closed and S3 open. In this mode the node N undergoes controlled commutation. The resonant time constant is determined by the values of C and L. During this interval departure from true resonant behaviour may occur due to load current contribution at node N. However 'true' resonant behaviour may be achieved as described earlier through the introduction of a current buffer as depicted in FIG. 2. After the voltage at node N has changed such that the voltage across S1 is zero or close to zero volts, mode 4 ends and the cycle is repeated. At this point in time the topology resumes the state of mode 1, S1 closed, S2 open and S3 open. The diagram in FIG. 3 shows clearly the four distinct modes and the corresponding electrical potential at the node N.

In modes 1 and 3 the switches S1 and S2 are in the closed position respectively and connect the drive voltage to the load prior to entering the modes 2 and 4 so that the load undergoes controlled commutation.

In modes 2 and 4 the switch S3 is in the closed position. It defines the controlled commutation interval undergone by the load.

At the beginning of modes 2 & 4 the inductor L has no residual energy associated with it. If necessary this condition is brought about by suitable energy dissipation or storage networks.

Full-Bridge Topologies

FIGS. 4 & 5 illustrate resonantly controlled commutating full-bridge topologies. In FIG. 5 a single resonant capacitor is present and is located across the load between the nodes N. These topologies are clearly based on a combination of the previously described 'single side', or half bridge load drive arrangements.

As in a conventional full-bridge arrangement the load may be driven in a push-pull manner through the simultaneous operation of switches S1 and S5 or the simultaneous operation of switches S2 and S4 (switches S1 and S6 remain open)

However unlike a conventional full-bridge drive, commutation is resonantly controlled by the value of the resonant capacitors and inductors and the timely operation of switches S3 and S6.

Figure 6:
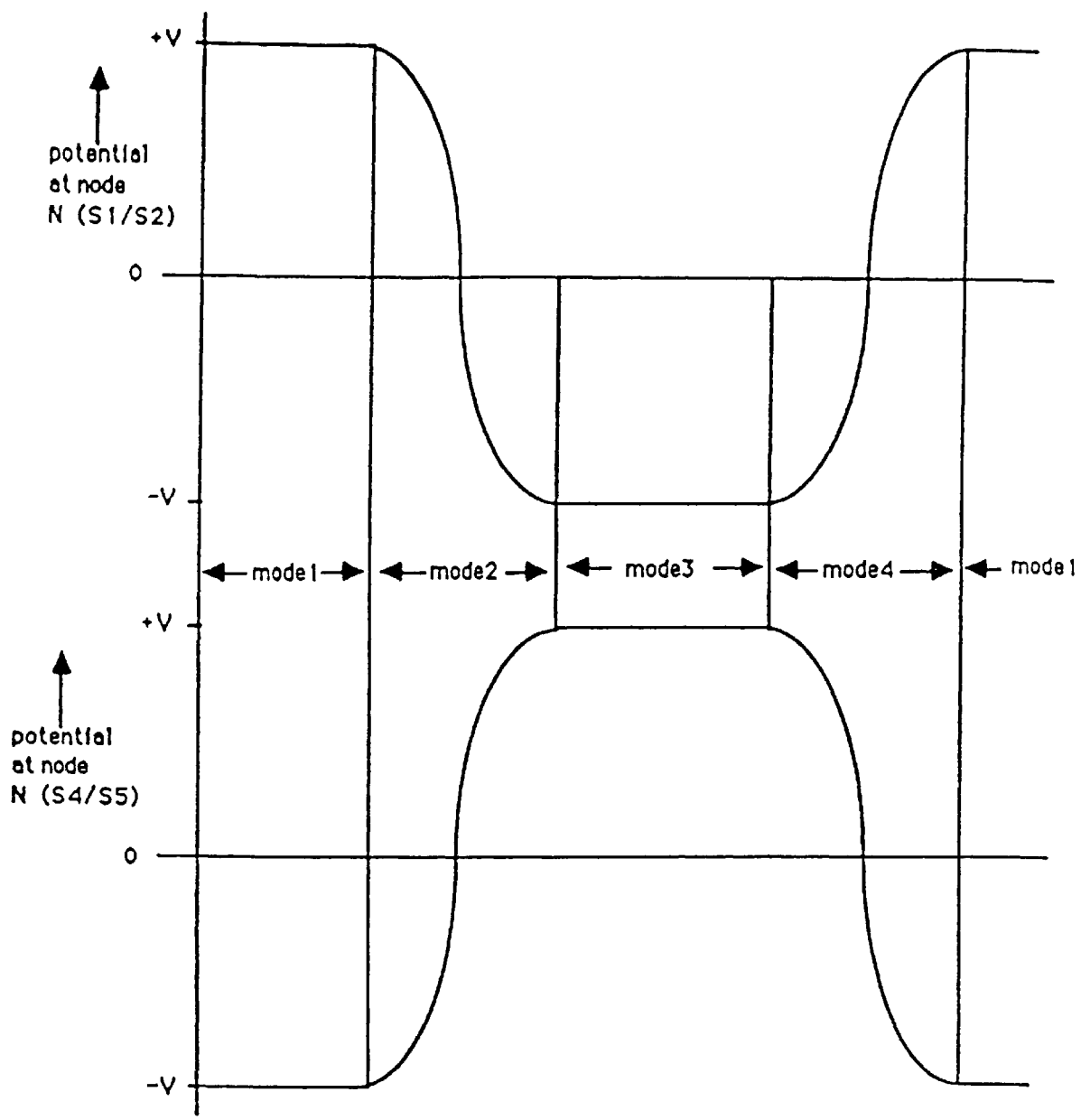
FIG. 6 is a graph showing schematically the voltage waveforms produced by parallel commutation of a full-bridge circuit.
Figure 7:
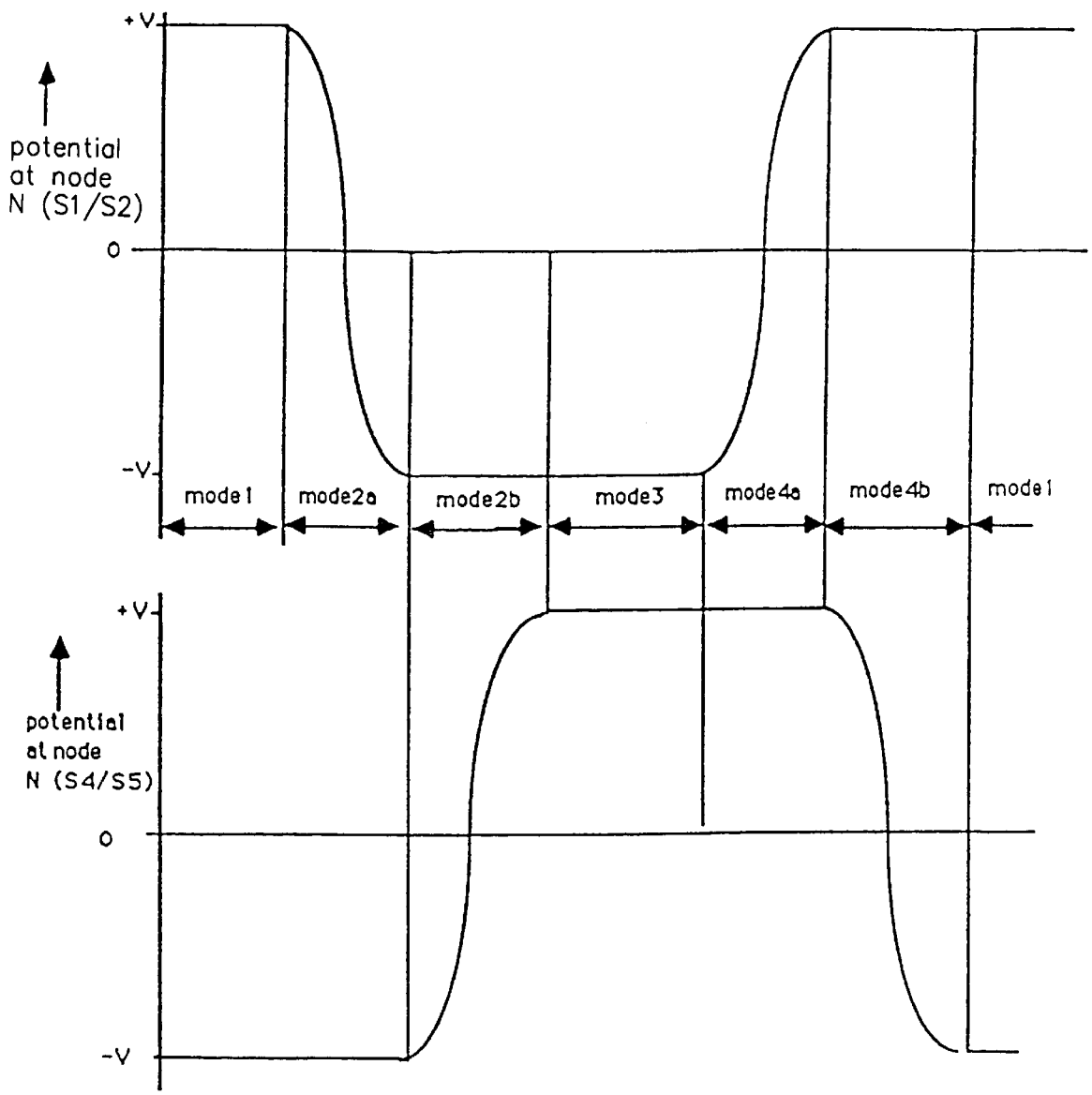
FIG. 7 is a graph showing schematically the voltage waveforms produced by serial commutation of a full-bridge circuit.

The following description together with FIGS. 6 & 7 describe the two types of controlled commutation that may take place and the modes of operation that result.

Serial or Parallel Controlled Commutation

The commutation is termed serial or parallel depending on the manner in which the nodes N, identified in the above topologies are allowed to commutate. Serial commutation enables the potential at nodes N at each end of the load to resonate in a controlled manner one after the other in time or 'serially'. Alternatively 'parallel' commutation enables the potentials at nodes N at each end of the load to resonate in a controlled manner simultaneously or in 'parallel'.

Parallel commutation occurs within a single mode, whereas serial commutation involves two separate and distinct modes of operation.

The behaviour of the above topologies is fully defined by the following modes of operation. Simultaneous operation of the switches is assumed when moving from one mode to another.

Mode 1
S1 closed, S2 open, S3 open, S4 open, S5 closed, S6 open

In this mode the voltage source V drives the load. The nodes N are maintained at the voltage +V and −V through the direct connection of S1 and S5 respectively. Refer to mode 2 for a description of parallel commutation or mode 2a for serial commutation.

Mode 2 (parallel commutation)
S1 open, S2 open, S3 closed, S4 open, S5 open, S6 closed In this mode both nodes N undergo controlled commutation. The electrical potentials at both nodes N, change in a symmetrical manner and achieve equal and opposite potentials. Mode 3 follows this mode.

Mode 2a (serial commutation)
S1 open, S2 open, S3 closed, S4 open, S5 open, S6 open In this mode the single node N between switches S1 and S2 undergoes controlled commutation while that between switches S4 and S5 remains unchanged.

Mode 2b
S1 open, S2 closed, S3 open, S4 open, S5 open, s6 closed

The start of this mode begins after the voltage at node N (between S1 and S2) has changed such that the voltage across S2 is zero or close to zero volts, and S2 is then closed simultaneously as S3 is opened. The switch S2 is thus zero voltage switched and the switch S3 is zero current switched. This node is maintained at the voltage −V through the direct connection of S2. The switch S4 remains open while S5 is opened and S6 is simultaneously closed. In this mode the single node N between switches S4 and S5 undergoes controlled commutation.

Mode 3
S1 open, S2 closed, S3 open, S4 closed, S5 open, S6 open.

Mode 3 begins after the voltage at nodes N have changed such that the voltage across S2 is zero or close to zero volts, and S2 is closed and the voltage across S4 is zero or close to zero volts, and S4 is closed. Throughout mode 3 the load is driven by the voltage source V. The nodes N are maintained at the voltage +V and −V through the direct connection of S4 and S2 respectively. Refer to mode 4 for a description of parallel commutation or mode 4a for serial commutation.

Mode 4 (parallel commutation)
S1 open, S2 open, S3 closed, S4 open,,S5 open, S6 closed In this mode both nodes N undergo controlled commutation. The electrical potentials at both nodes N, change in a symmetrical manner and achieve equal and opposite potentials.

At the time that the voltages across S1 and S5 are zero or close to zero volts, mode 4 ends and the cycle may be repeated. At this point in time the topology resumes the state of mode 1.

Mode 4a (serial commutation)
S1 open, S2 open, S3 closed, S4 closed, S5 open, S6 open In this mode the single node N between switches S1 and S2 undergoes controlled commutation while that between switches S4 and S5 remains unchanged.

Mode 4b
S1 closed, S2 open, S3 open, S4 open, S5 open, S6 closed

The start of this mode begins after the voltage at node N (between S1 and S2) has changed such that the voltage across S1 is zero or close to zero volts, and S1 is then closed simultaneously as S3 is opened. The switch S2 is thus zero voltage switched and the switch S3 is zero current switched. This node is maintained at the voltage +V through the direct connection of S1. The switch S5 remains open while S4 is opened and S6 is simultaneously closed. In this mode the single node N between switches S4 and S5 undergoes controlled commutation. This mode ends at the time that the voltages across S5 is zero or close to zero volts, and the cycle may then be repeated. At this point in time the topology resumes the state of mode 1. The diagrams in FIGS. 6 and 7 show clearly the various modes for parallel and serial commutation respectively. The potentials at nodes N between the switches S1/S2 and S4/S5 are depicted.

As for the half-bridge topology discussed above, commutation period or time is determined by the values of C and L. During this interval departure from true resonant behaviour occurs due to load current contribution at node N. As with the previous simpler topologies commutation may be divorced from the effects of load current through the introduction of suitable current buffers driving both nodes N. In applications in which power pulse edge distortion due to load current variation is unimportant, e.g. designs offering only low electromagnetic interference (EMI), load current contribution at nodes N may not pose a problem and may not require current buffer compensation.

In modes 1 and 3 the switches S1 and S2 are in the closed position respectively and connect the drive voltage to the load prior to entering the modes 2 and 4 that the load undergoes controlled commutation.

In modes 2 and 4 the switch S3 is in the closed position. It defines the controlled commutation interval undergone by the load.

At the beginning of modes 3 & 4 the inductor L has no residual energy associated with it. If necessary this condition is brought about by suitable energy dissipation or storage networks.

The features of adopting a topology utilising a single resonant capacitor, is that closely matched commutation at both sides of the bridge can be achieved and a resulting lower component count design.

Serial commutation of the nodes N may be executed in reverse order to that shown in FIG. 7. In fact the commutation of nodes N may take place in any order, and the examples described by no means limits the application.

Switches/devices, S1, S2, S4, S5 are zero voltage witched, and S3 and S6 are zero current switched at all times. This arrangement minimises power dissipation within the devices.

Other Variations on the Basic Topology

Figure 8:
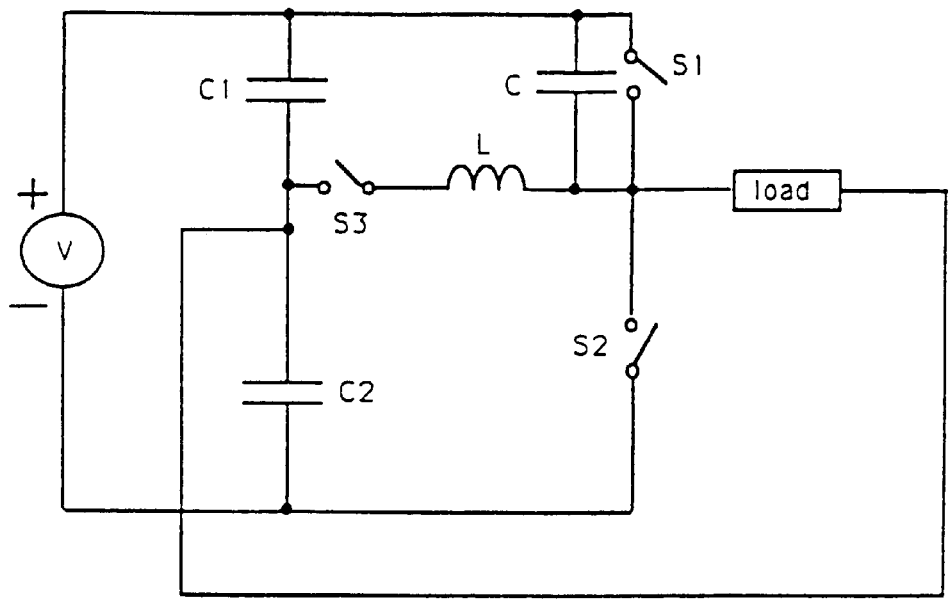
FIG. 8 is a modified half-bridge commutator with the resonant capacitor in an alternative position.
Figure 9:
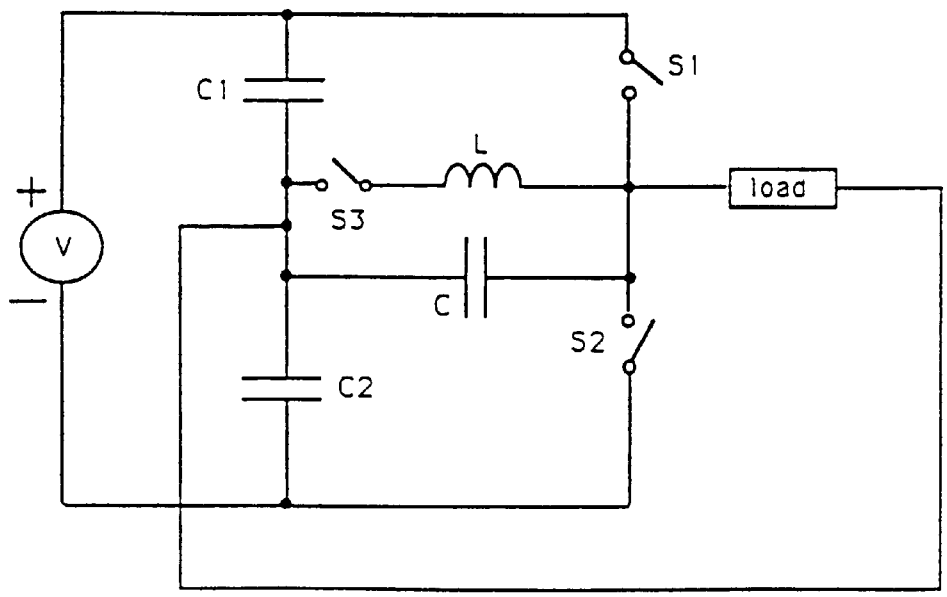
FIG. 9 is a modified half-bridge commutator with the resonant capacitor in parallel with the resonant inductor.

The topologies in FIGS. 8 and 9 behave similarly in operation to that in FIG. 1 except that the resonant capacitor has been repositioned. Buffered versions (not shown here) exist which can be developed similar to that in which FIG. 2 was developed from FIG. 1. Full bridge versions also exist and may be developed in the manner in which FIG. 4 has been derived from FIG. 1. Modes of operation of these complementary topologies are similar to those discussed earlier. The topology of FIG. 9, with C parallel to L, results in the capacitor C being charged at both plates and undergoing polarity reversal. This circuit is therefore suitable for use with non-polarised capacitor types. By contrast, in the circuits of FIGS. 1 and 8, the capacitor C may be a polarised, e.g. electrolytic, type.

Figure 10A:
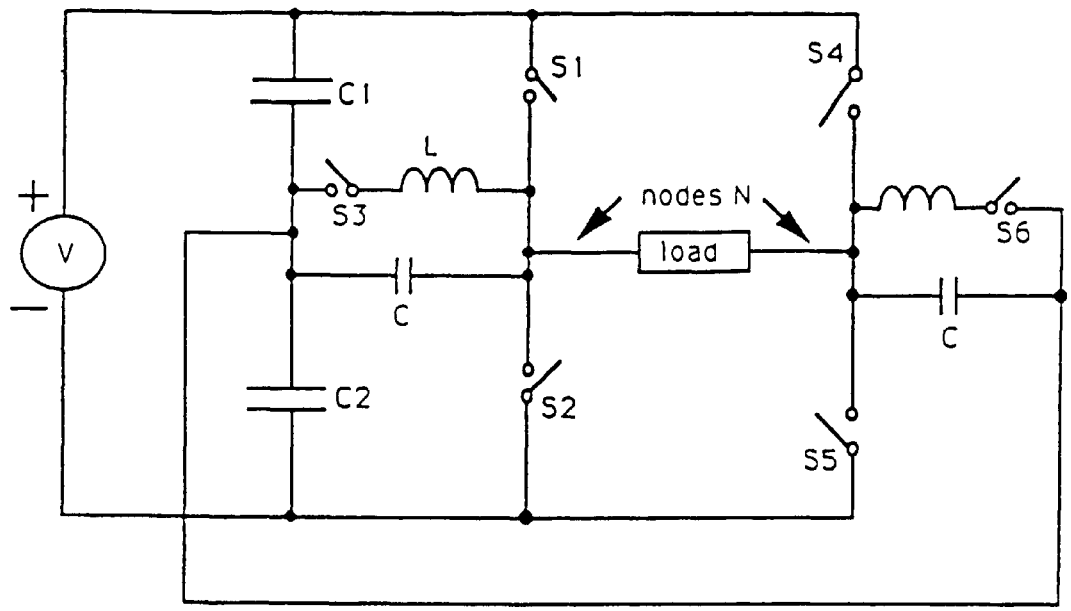
FIGS. 10a & 10b are a third example of a full-bridge commutator.
Figure 24:
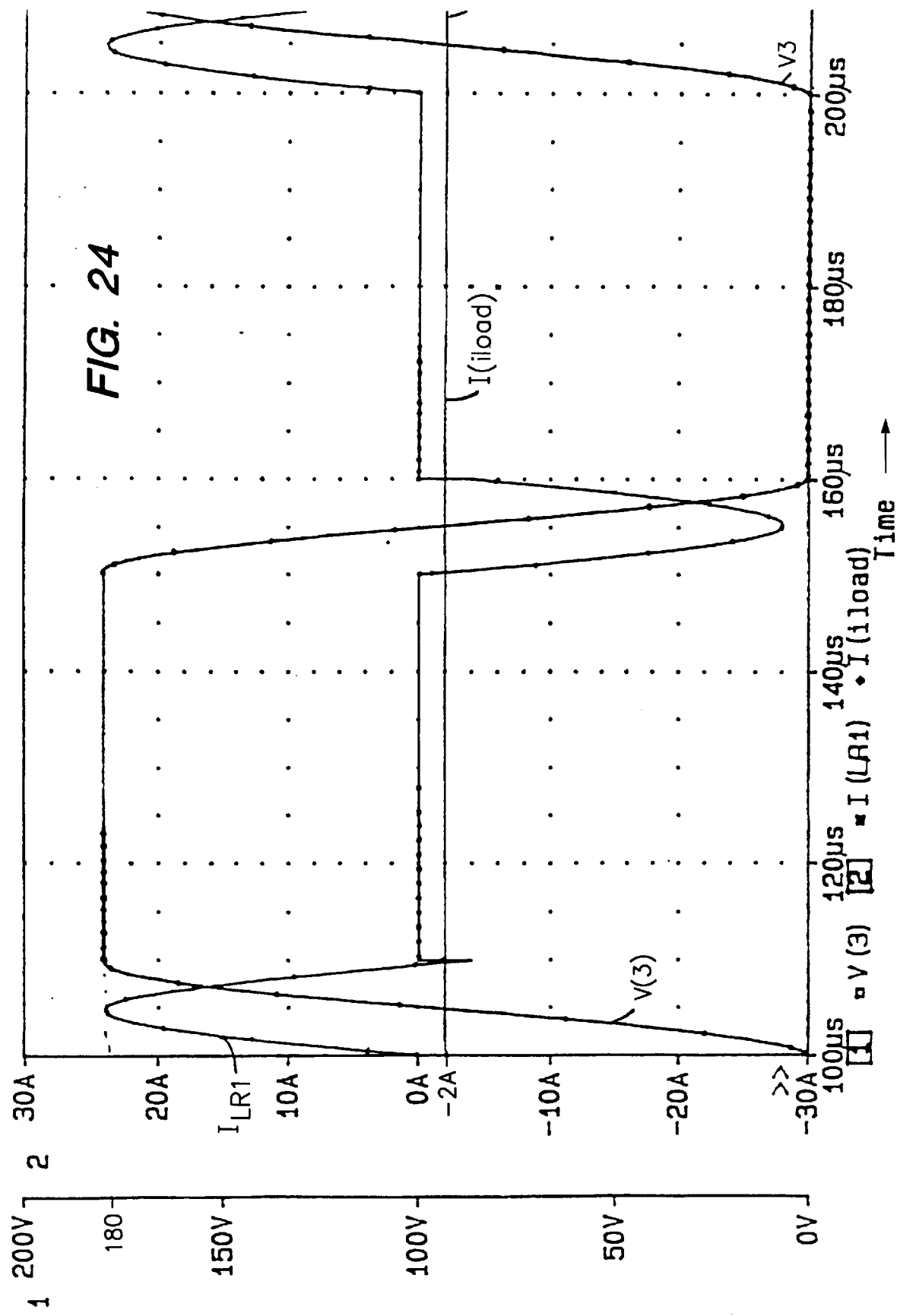

The topology in FIG. 9 leads to that in FIG. 10a just as the topology in FIG. 1 leads to that in FIG. 4. Note that the resonant capacitor C is repositioned. Modes of operation for topology in FIG. 1 are similar to those in FIG. 9. Modes of operation for topology in FIG. 4 are similar to those for FIG. 10a. These modes have already been discussed. Table 1 lists component values for one example of the circuit of FIG. 10a, and FIG. 24 shows the output waveform produced by the circuit. It can be seen that the resonantly controlled edge of the voltage waveform V3 has a rise-time of around 10 microseconds, by contrast with prior art commutators where the rise-time might be as short as 0.1 microseconds.

Figure 10B:
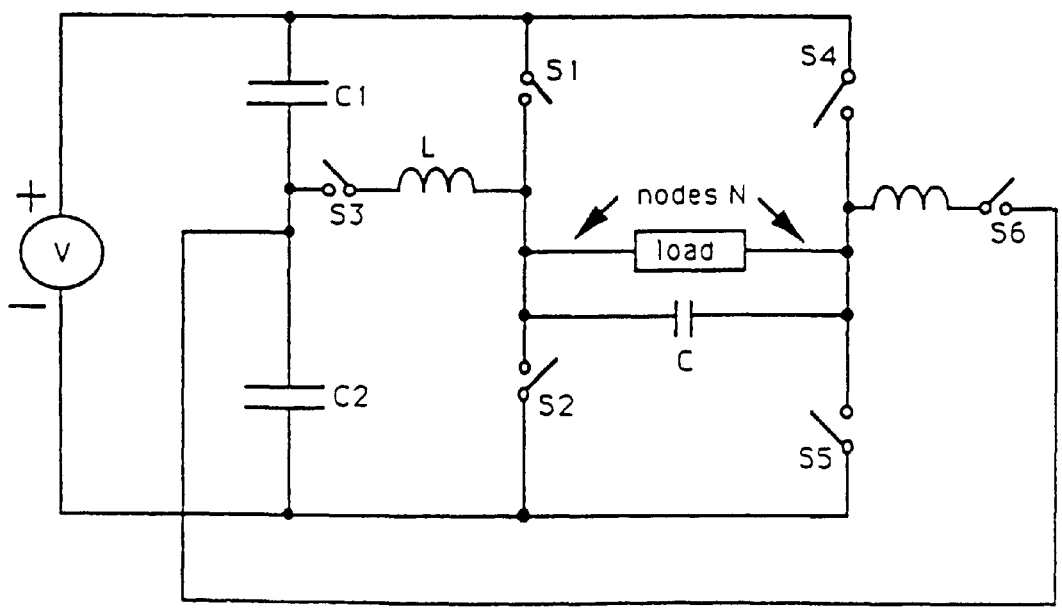

The circuit of FIG. 10a may be modified as shown in FIG. 10b by the use of a single capacitor C which is common to the two resonant arms and is connected in parallel across the load. This reduces the number of components required, and provides increased symmetry in commutation.

Figure 11:
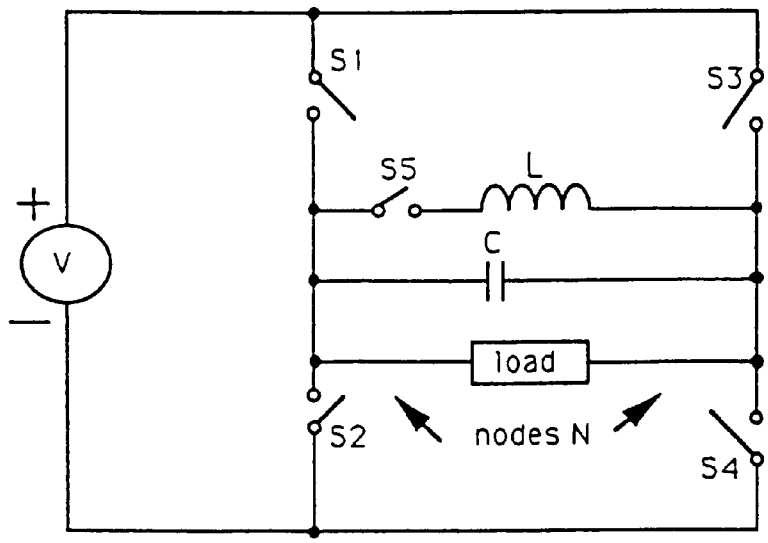
FIG. 11 is a fourth example of a full-bridge commutator.
Figure 12:
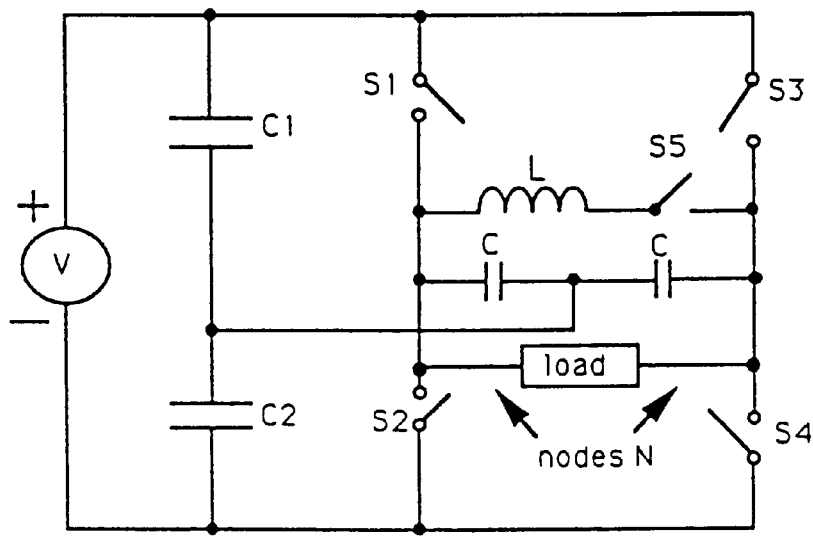
FIG. 12 is a fifth example of a full-bridge commutator.
Figure 13:
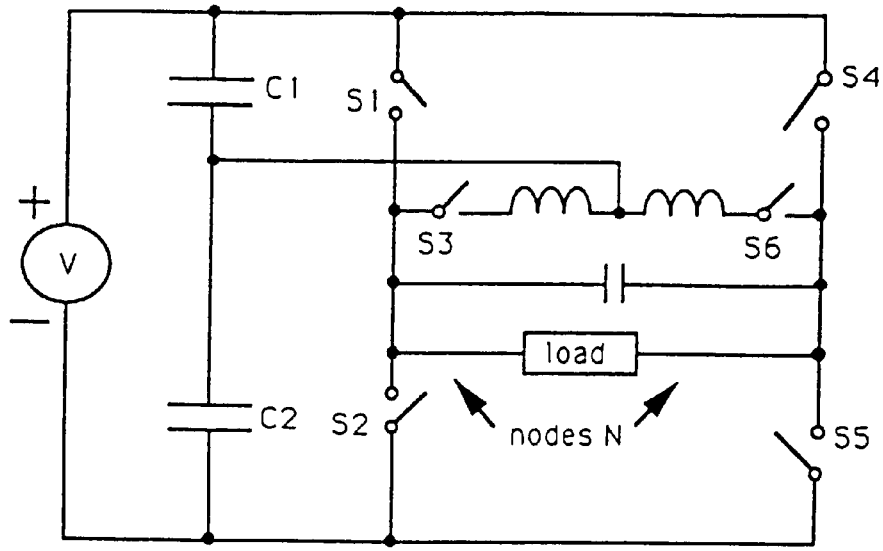
FIG. 13 is a sixth example of a full-bridge commutator.

The resonant capacitor may also be positioned as shown in FIG. 11. This is yet again a variation on the same theme. Topologies in FIGS. 12 and 13 again are derived from that in FIG. 11. The circuit of FIG. 11 uses a single resonant arm coupled across the bridge in parallel with the load and connecting the midpoints of either side of the bridge. It offers the advantage of a reduced component count, and with ideal components provides intrinsically symmetric commutation of the load. In reality however, stray capacitances are likely to cause departures from symmetry. The position of the switch S5 in FIG. 11 has the disadvantage that it has to operate at widely varying voltages, according to the position of the switches of the bridge. The circuits of FIGS. 12 and 13 are more balanced than FIG. 11, but require more components.

Figure 14:
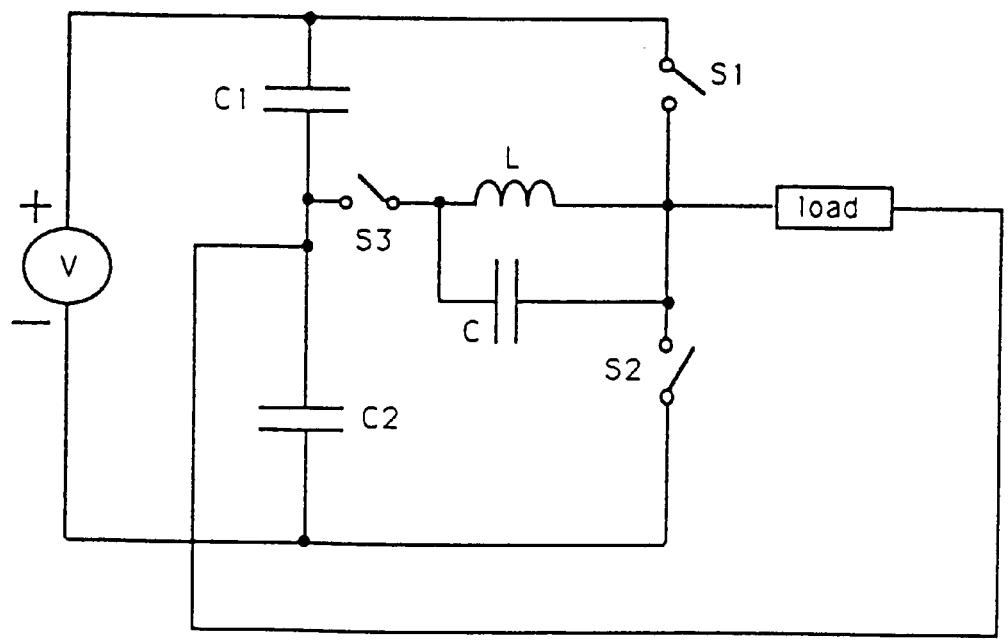
FIG. 14 is a first example of a half-bridge commutator using an alternative switching arrangement for the resonant limb.
Figure 15:
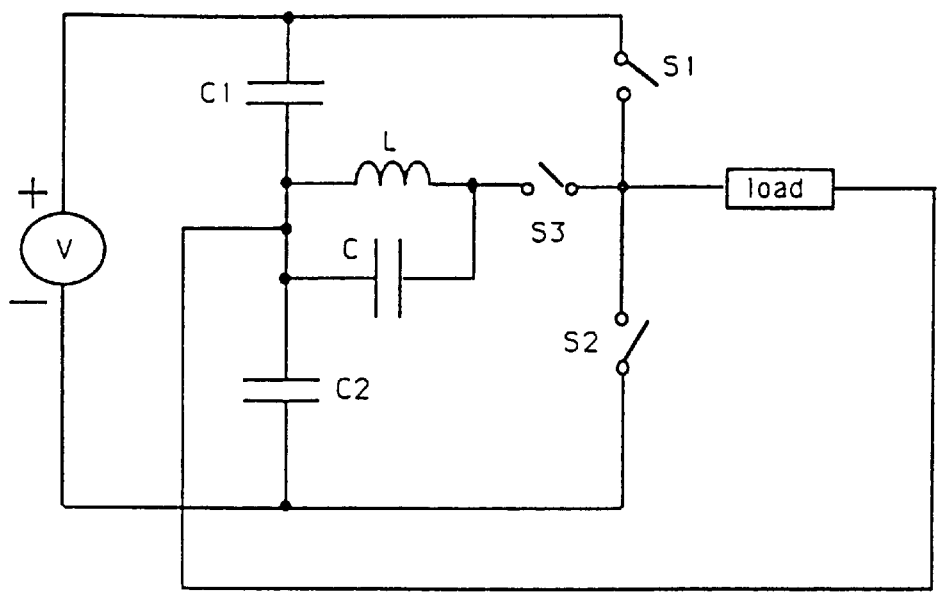
FIG. 15 is a second example of a half-bridge commutator using an alternative switching arrangement for the resonant limb.
Figure 16:
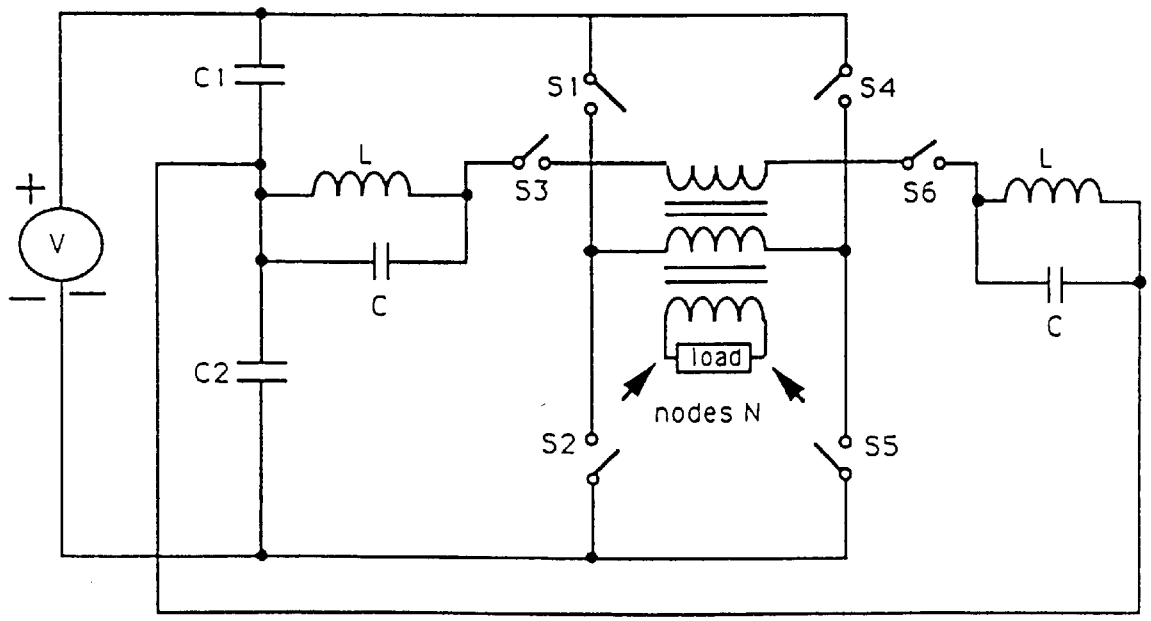
FIG. 16 is a further example of a full-bridge commutator in which the load is transformer-coupled.
Figure 17:
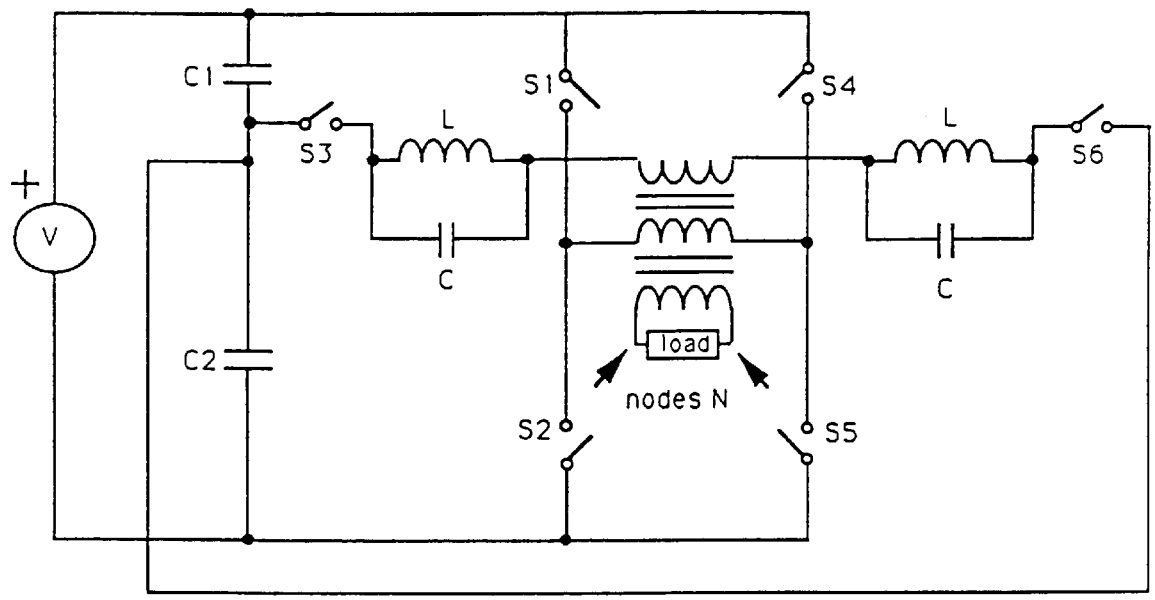
FIG. 17 is a further example of a full-bridge commutator in which the load is transformer-coupled.

The topology in FIGS. 14 and 15 incorporate the same resonant limb L and C but the resonant limb is switched into the circuit in a different way. These two topologies however include an extra mode of operation which enables the resonant capacitor to be precharged to half the supply voltage V/2 in some instances. In the topology of FIG. 14, the switch S3 switches at peak current. In the circuit of FIG. 15, the switching voltage of S3 varies according to the configuration of the commutator switches S1, S2. Topologies 16 and 17 give an example of how the action of the resonant limb may be transformer coupled into the load. This allows the load to be isolated from the commutator circuit and so is advantageous, for example, in applications in medical electronics where the load may be in contact with a patient, or in technology for rail-mounted vehicles, where isolation may be required to reduce susceptibility to interference. The load may be grounded or connected to a reference voltage.

The transformer used for coupling the load in these Figures has three windings, with more windings on the primary side connected to the commutator circuit than on the secondary side connected to the load, giving a winding ratio m:n. The middle winding connected to the midpoints of the bridge may, for example have the same number of windings as the secondary. This arrangement has the advantage that any current reflected back into the primary from the load is reduced in the ratio n/m and the load reflected in to the resonant limb is less.

Lossy and Lossless Snubber Networks

Figure 18:
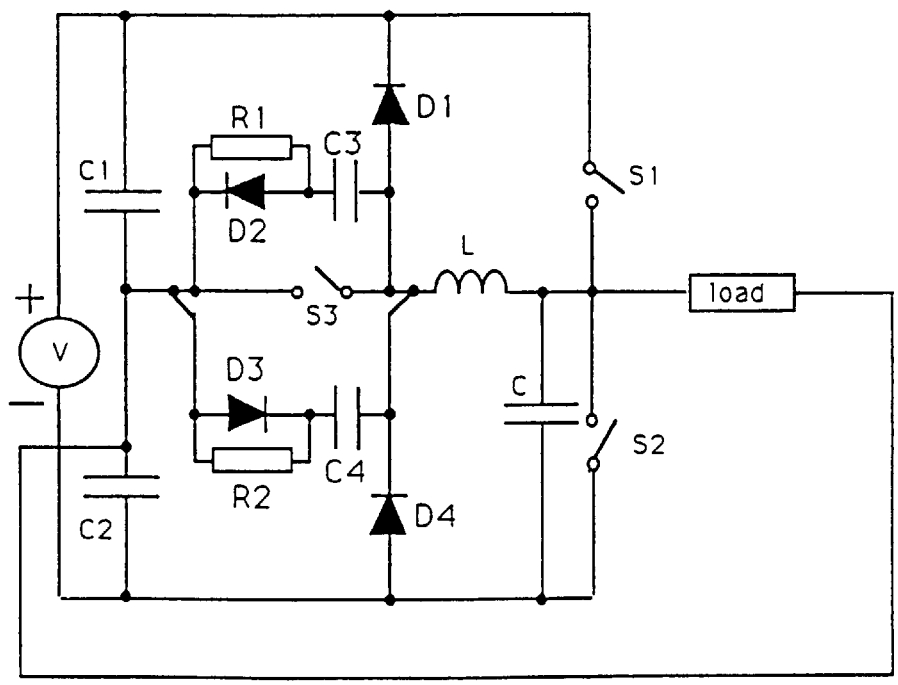
FIG. 18 is a half-bridge commutator incorporating snubber networks with the resonant limb.

In all the topologies it may be desirable to introduce snubber networks in the implementation of a design. Snubber networks may be incorporated with the "switches" associated with the resonant limb (e.g. S3 in FIG. 1). A typical network is shown in FIG. 18 to include snubber network components D', D2, D3, D4, C3, C4, R1 and R2. The snubber networks effectively reset the starting conditions for the switch, reduce the peak current on closing and so reduce r.f. emission from the switch.

A lossless network, may be introduced, that returns energy to the supply as a method of improving efficiency whilst ensuring initial topology conditions at the start of each mode of operation.

It is however unlikely that snubber networks will be needed for the "switches" not associated with the resonant limb (e.g. S1 and S2 in FIG. 1 etc.).

Motor Drive Circuit

Figure 19:
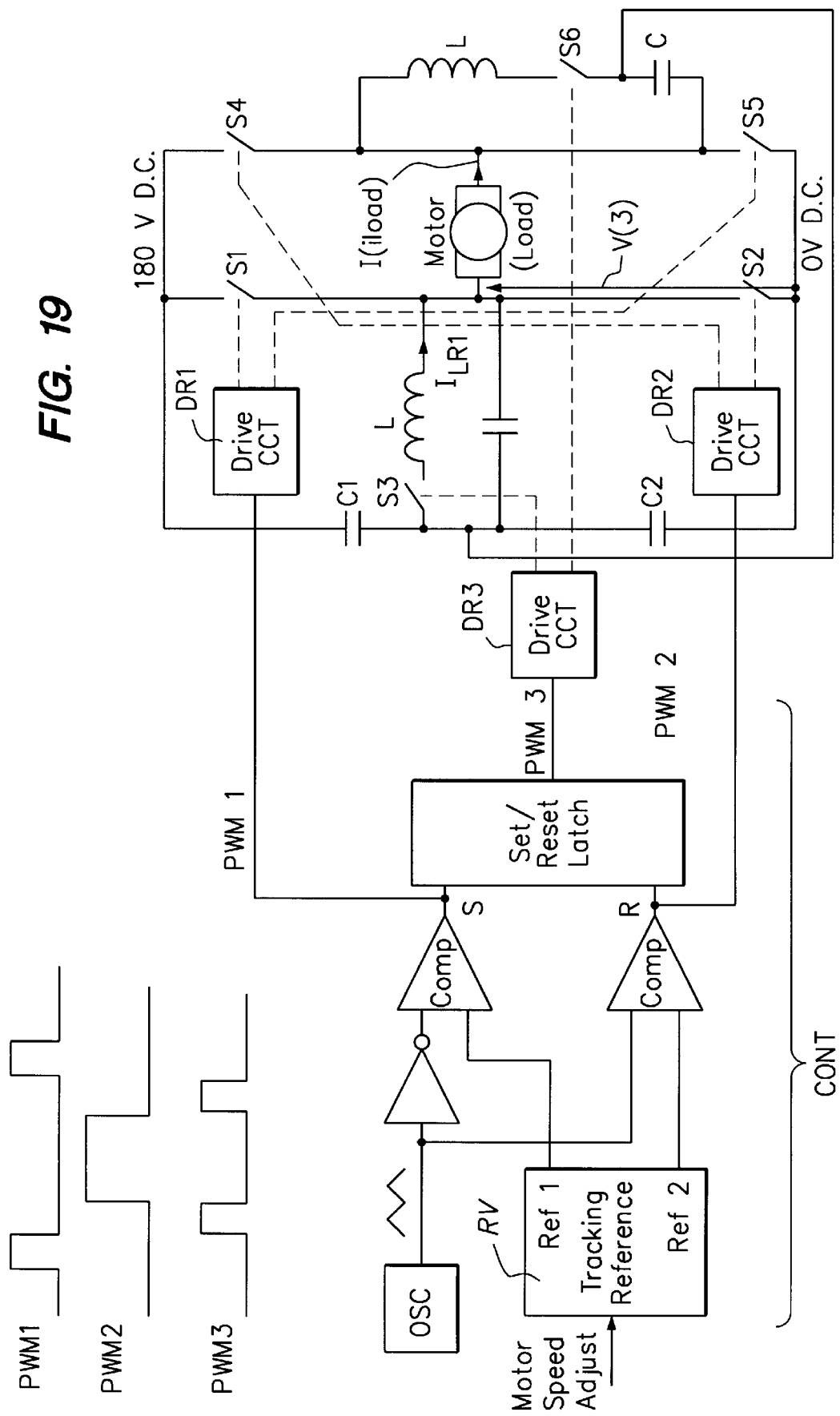
FIG. 19 is an open-loop servo drive circuit.

FIG. 19 shows an open loop servo drive circuit for an electric motor. The commutator in this circuit has a topology generally corresponding to that of FIG. 10a discussed above. The switches S1, S2, S4, S5 are controlled by drive voltages from the drive circuits DR1, DR2. These circuits are arranged to provide voltages appropriate to the switch-types used in the commutator bridge with the drive signals to the different switches being effectively isolated from each other. The drive circuits DR1, DR2 are controlled by respective pulse-width modulated signals PWM1, PWM2 output by a control circuit CONT. The control circuit outputs a third PWM signal, PWM3 which operates the switches in the resonant arms S3, S6 via a third drive circuit DR3. The signals PWM1–PWM3 are synchronised with respect to each other with timing waveforms for example as shown in the figure, so as to produce a desired commutation cycle. The relative timing of the different drives may be varied according to whether parallel or serial commutation is required.

In the control circuit CONT the PWM waveforms are produced by comparators COMP which have inputs taken respectively from a variable reference voltage source RV and an oscillator OSC producing a saw tooth output. The reference voltages may be adjusted so as to vary the duty cycle of the PWM signals, thereby providing control over the speed of the motor.

Although the basic circuit shown is an open-loop drive, this may be elaborated, for example, by adding a feedback loop from a motor speed sensor to the control circuit CONT. As an alternative to PWM, a variable frequency control may be used for the motor.

Digital Audio Amplifier

Figure 20:
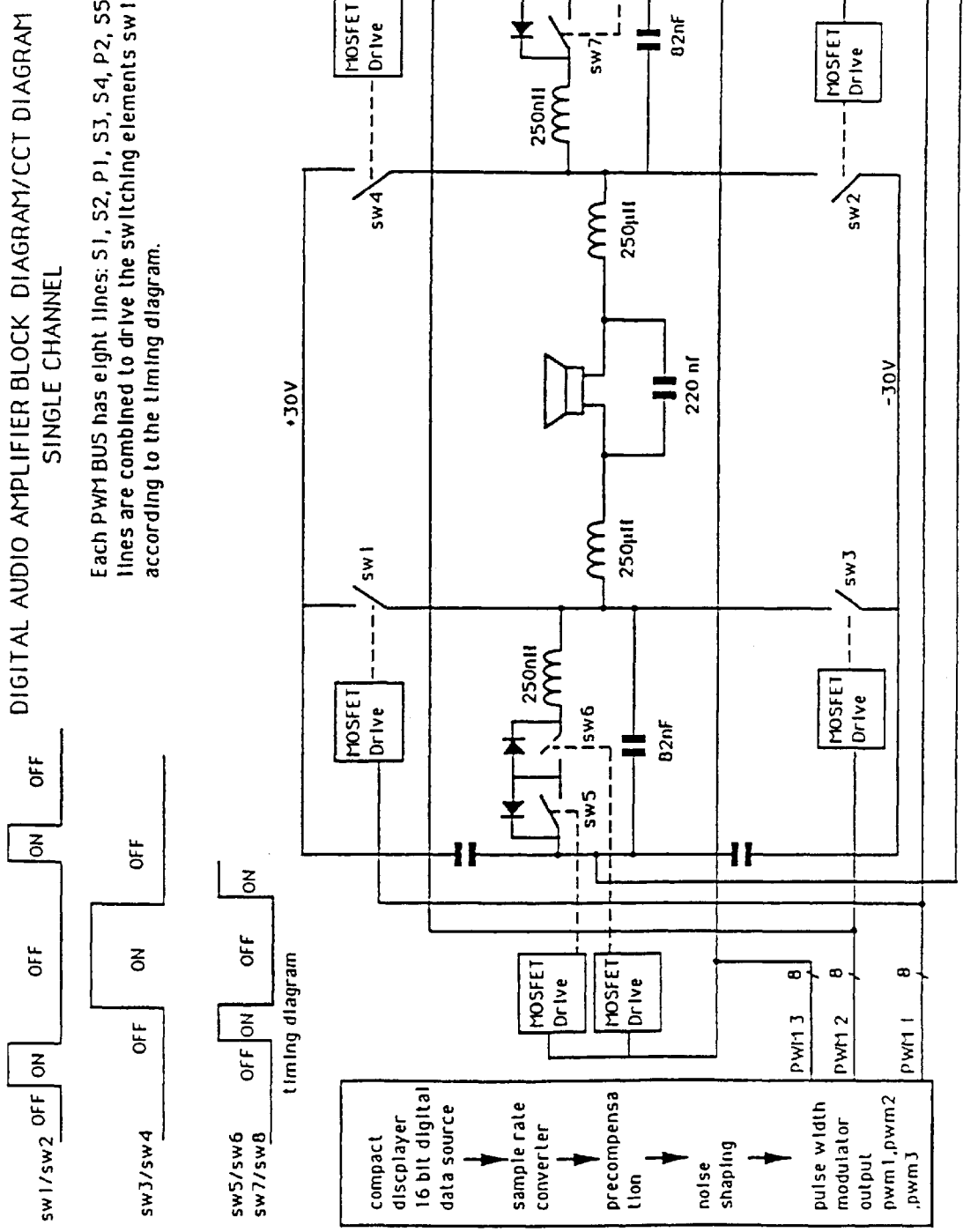
FIG. 20 is a circuit diagram for one channel of a digital audio amplifier.
Figure 25:
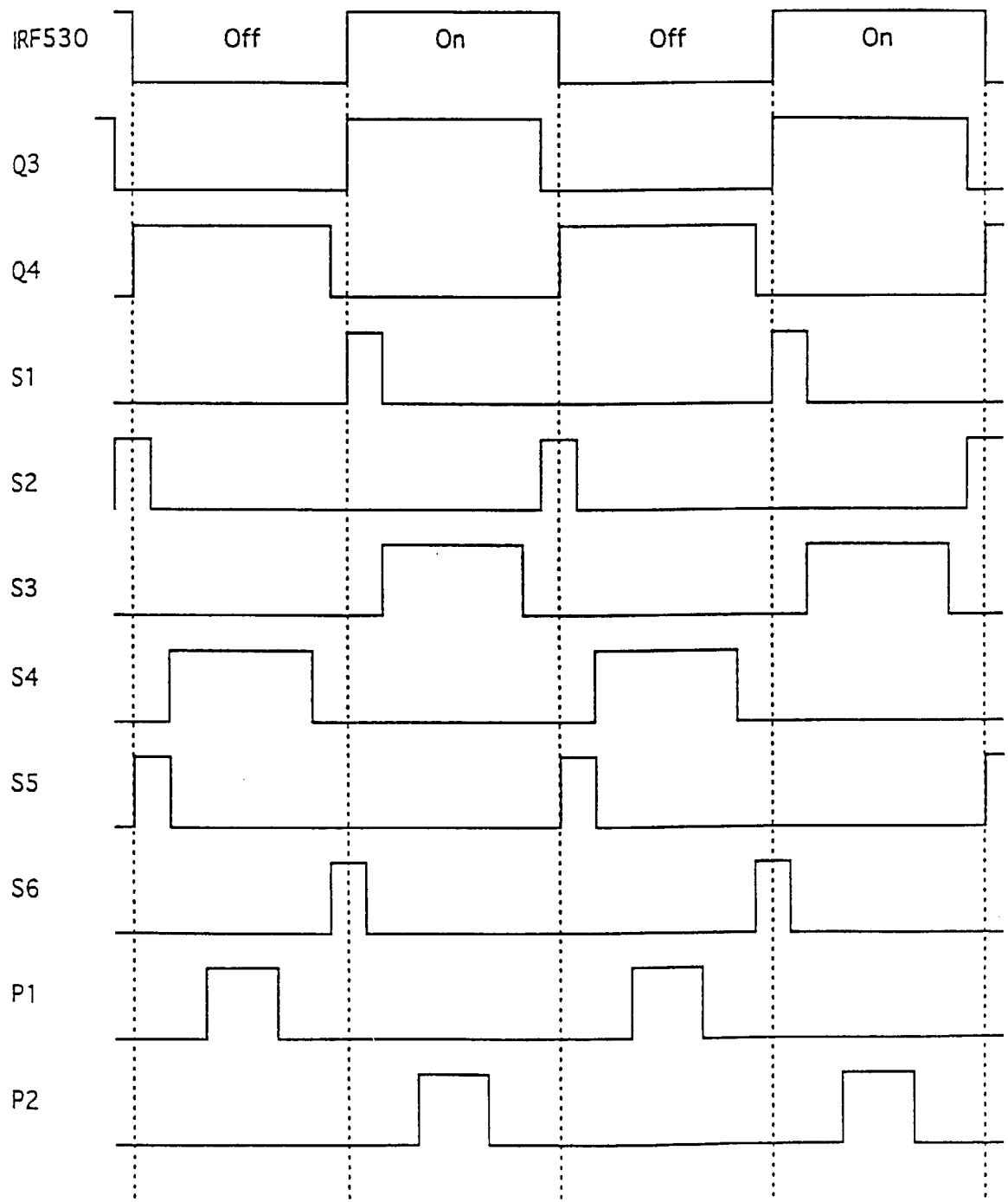
FIG. 25 is a drive circuit timing diagram for the amplifier of FIG. 20.

FIG. 20 is a circuit diagram for one channel of a digital audio amplifier incorporating a commutator in accordance with the present invention. In this circuit, each PWM BUS has eight lines S1 S2 P1 S3 S4 P2 S5 S6, where S-lines are connected to signal windings, P-lines to power windings. All lines are combined to drive the switching elements sw1–sw8 according to the timing diagram of FIG. 25. The circuit has power rails at +30V and −30V. The switches sw5/6 sw7/8 used in this example incorporate body diodes and are therefore used in pairs with the body-diodes in opposition. The commutator topology generally corresponds to that of FIG. 10a.

Figure 21:
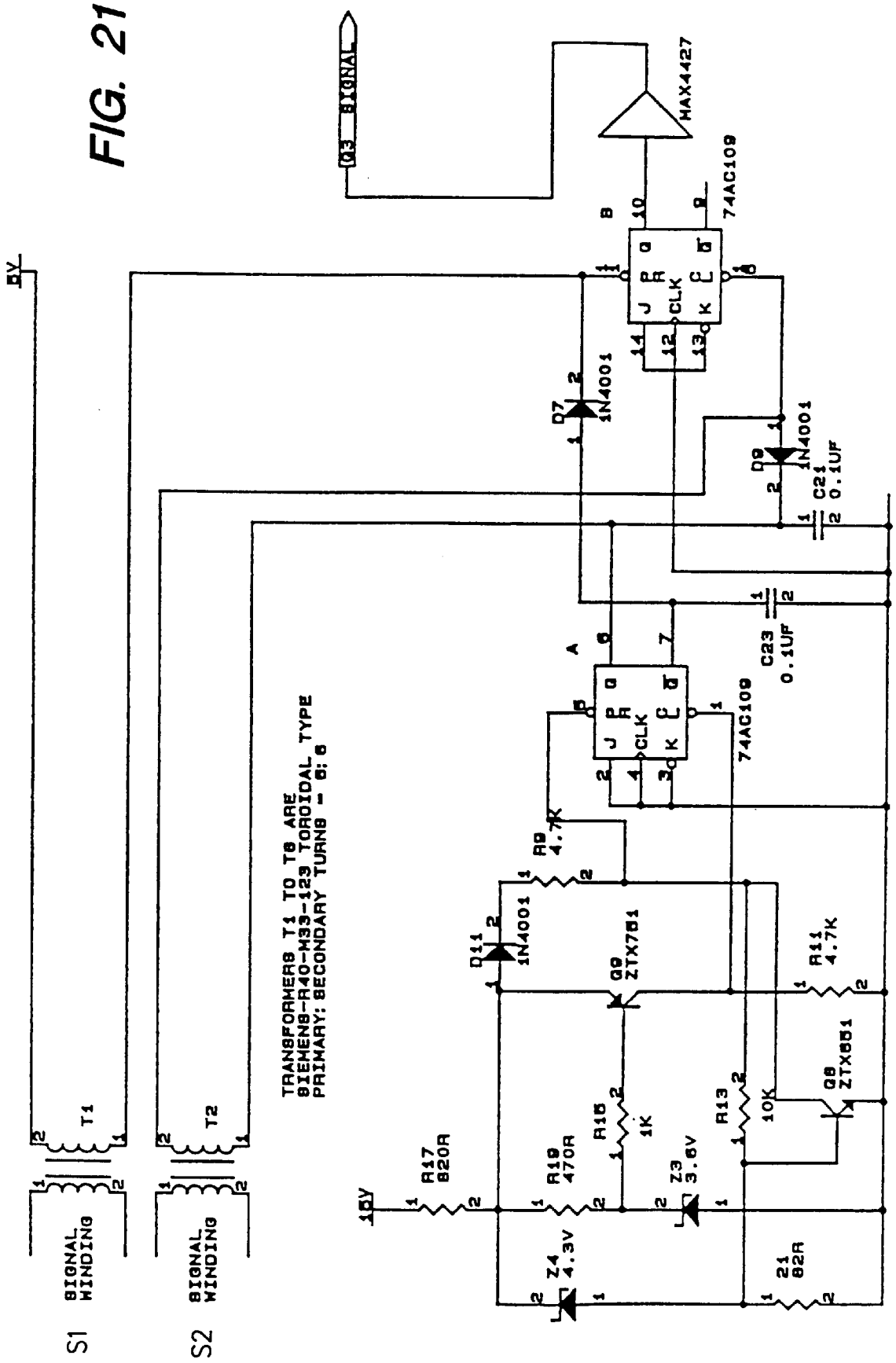
FIGS. 21 to 23 are circuit diagrams for the MOSFET drive circuits of FIG. 20.
Figure 22:
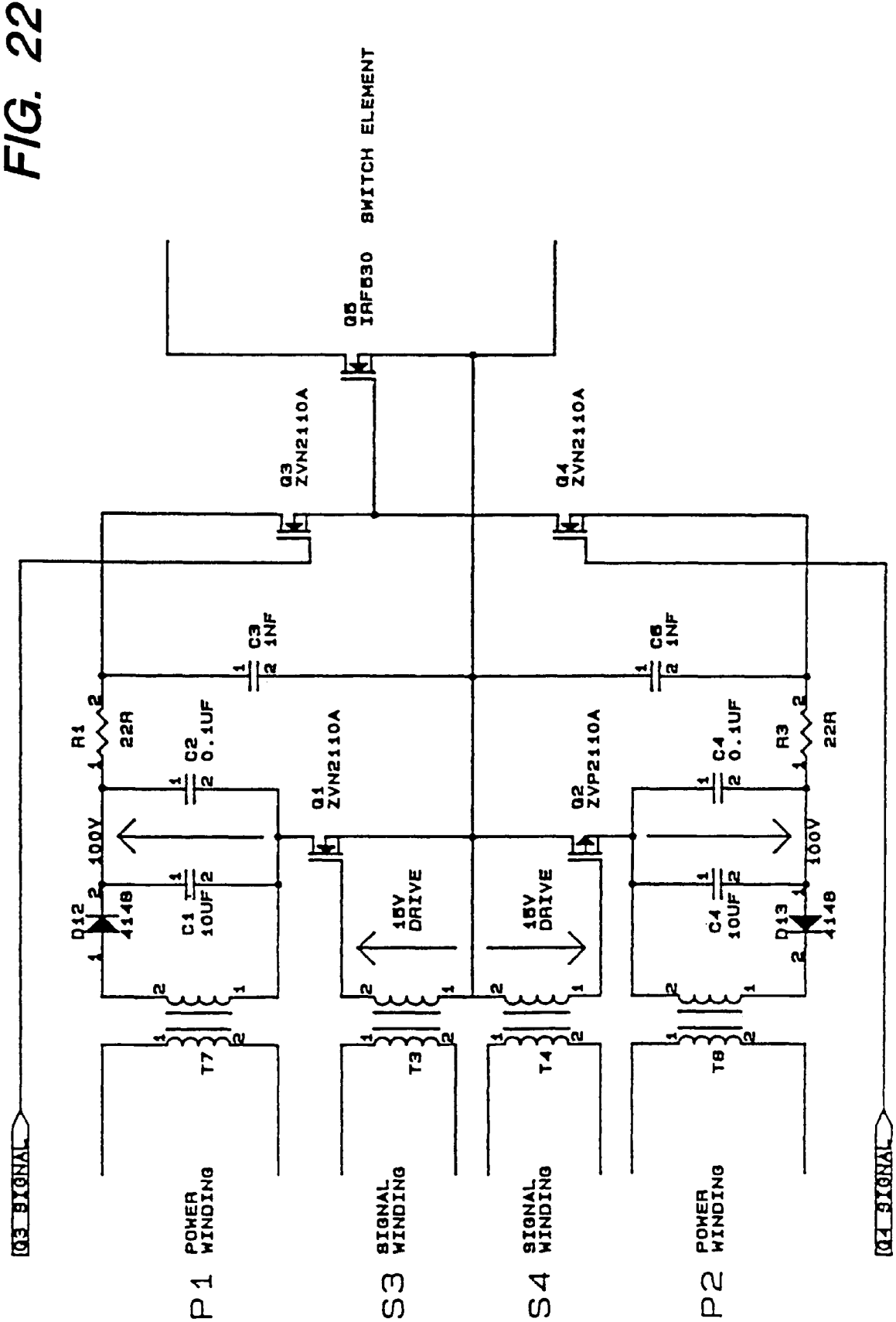
Figure 23:
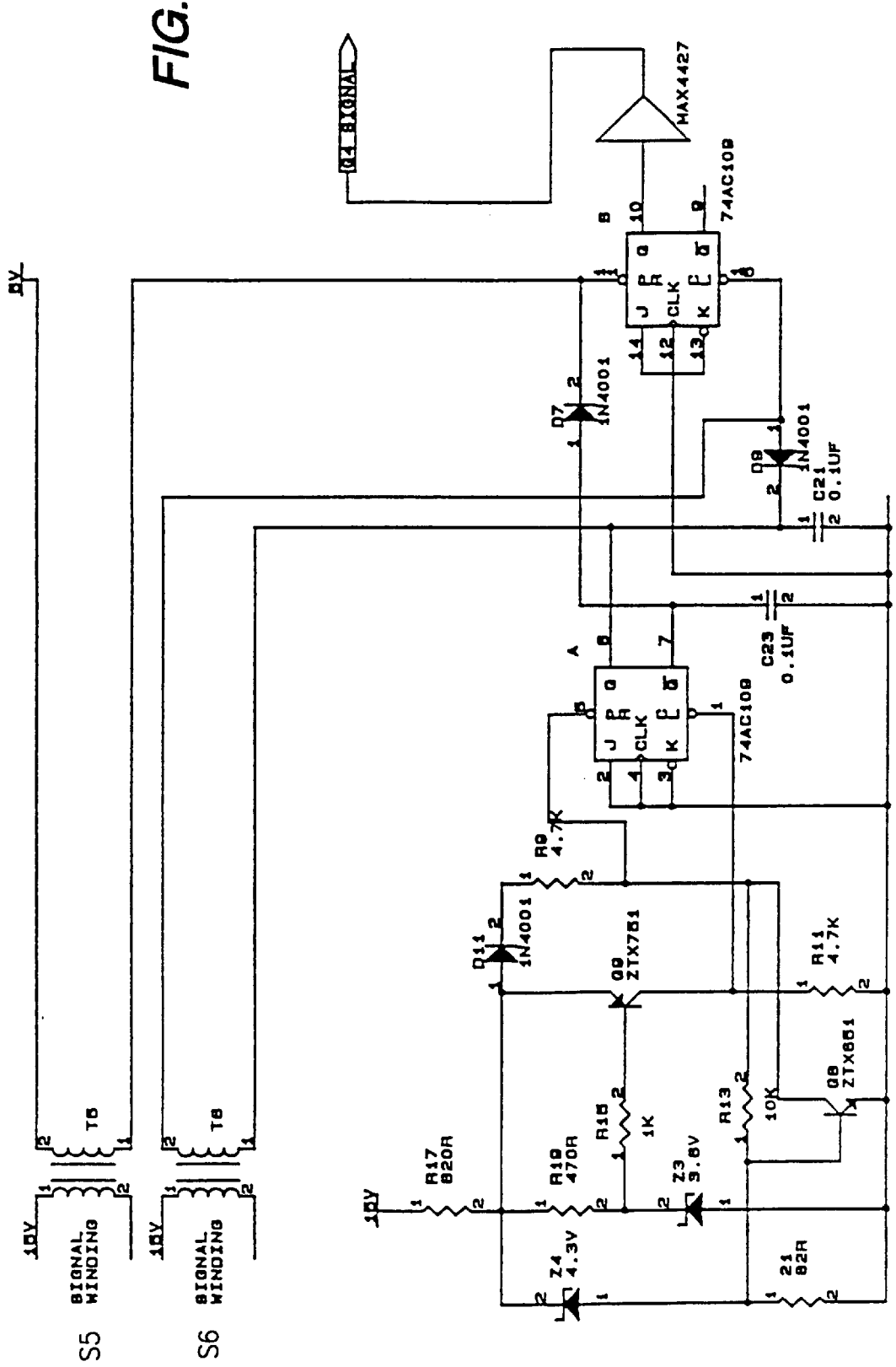

FIGS. 21 and 23 show circuits generating inputs Q3, Q4 to the one of the 8 MOSFET drive circuits shown in FIG. 22 (the other drive circuits correspond and have corresponding input circuits). The switching element is a MOSFET device IRF530.

It will be understood that specific circuit configurations and component values are given by way of example only, and that other circuits and values may be selected while still falling within the scope of the present invention.

TABLE 1

(PSPICE Listing)

```
.tran 50 ns 350 us 0DS 300 ns uic
.MODEL SMOD VSWITCH VON = 1 VOFF = .9 RON = 0.01
ROFF = 1E9
.MODEL SMOD3 VSWITCH VON = 100 mv VOFF =0 90 mV
RON = 0.01 ROFF = 1e9
.MODEL SMOD2 VSWITCH VON = 0 mV VOFF = 10 mV RON = 0.01
ROFF = 1E9
.MODEL DMOD D
V1 1 0 90
V2 2 1 90
S1 2 3 10 0 SMOD
RS1 10 0 10K
VS1 10 0 PULSE (0 1.55 10US 1NS 40US 100US)
S4 4 0 10 0 SMOD
S5 6 1 60 0 SMOD3
LR2 4 6 11UH
CR2 1 4 0.9 uf ic = −90
S2 2 4 30 0 SMOD
S3 3 0 30 0 SMOD
RS3 30 0 10K
VS3 30 0 PULSE (0 1.5 60US 1NS 1NS 40US 100US)
S6 1 5 60 0 SMOD3
LR1 5 3 11UH
CR1 1 3 .92 uf ic = 90
RS6 60 0 10K
VS6A 6A 0 PULSE (0 1.5 0NS 1NS 1NS 10US 100US)
RVS6A 6A 60 100K
VS6B 6B 0 PULSE (0 1.5 50US 1NS 1NS 10US 100US)
RVS6B 6B 60 100K
*LLOAD 3 4 480UH ic = 10
iload 3 4 −2
.PROBE
```

I claim:

1. An invertor circuit including a commutator bridge (1) having switches in each arm of the bridge and arranged to have a load (2) coupled to a mid-point of the bridge and a switched resonant arm (3) comprising a capacitor (C) and an inductor (L) also coupled to the mid-point of the bridge, characterised in that the commutator bridge is arranged to be switched into independent ones of only three switch states in a predetermined sequential and cyclical manner to provide controlled resonant commutation of the voltage of the mid-point of the bridge, in that said capacitor (C) and said inductor (L) are coupled in parallel, and in that the resonant arm is connected to a potential having a value of substantially V/2 where V is the drive potential across the bridge.

2. A circuit according to claim 1, in which the resonant arm is connected to a potential having a value of substantially V/2, where V is the drive potential across the bridge.

3. A circuit according to claim 1, including a pair of capacitors (C1, C2) coupled in series with respect to each other and in parallel across respective switches in the arms of the bridge, and the switched resonant arm is coupled between the common mid-point of the two capacitors, and the said mid-point of the bridge.

4. A circuit according to claim 1, in which the resonant arm comprises an LC circuit.

5. A circuit according to claim 4, in which in the switched resonant arm a switch is coupled in series with the inductor L of the LC circuit.

6. A circuit according to claim 5, in which the switch has one pole coupled to the said potential of value substantially V/2, and the other pole coupled to the inductor.

7. A circuit according to claim 1, in which the LC circuit includes further inductor (L) coupled in series via the switch to the mid-point of a pair of capacitors and a further capacitor (C) coupled in parallel with one of the switches (S2) in the arm of the bridge.

8. A circuit according to claim 1 in which the load is transformer-coupled to the bridge.

9. A circuit according to claim 8, in which the load is coupled via a transformer having at least three windings including a primary winding connected to the resonant arm and a secondary winding connected to the load.

10. A circuit according to claim 9, in which the ratio of the number of turns on the said primary winding to the said secondary winding is m:n where m and n are positive integers and m is greater than n.

11. A circuit according to claim 1 in which the switched resonant arm is coupled to the bridge via a current buffer (B).

12. A circuit according to claim 1, including a further resonant arm across the bridge.

13. A circuit according to claim 1, including at least two resonant arms, one coupled to each side of the bridge.

14. A circuit according to claim 15 including at least one resonant element (C; FIG. 10b) common to the at least two resonant arms.

15. A circuit according to claim 13 in which the two halves of the full-bridge circuit are arranged to commutate in series.

16. A circuit according to claim 13, in which the two halves of the full-bridge circuit are arranged to commutate in parallel.

17. A circuit according to claim 1 including a snubber network acting on the switch of the switched resonant arm.

18. A digital power amplifier including a commutator circuit, said commutator circuit comprising a commutator bridge (1) having switches (S1, S2: 54,55) in each arm of the bridge and arranged to have a load (2) coupled to a mid-point of the bridge and a switched resonant arm (3) comprising a capacitor (C) and an inductor (L) also coupled to the mid-point of the bridge, characterised in that the commutator bridge is arranged to be switched into independent ones of only three switch states in a predetermined sequential and cyclical manner to provide controlled resonant commutation of the voltage of the mid-point of the bridge and in that said capacitor (C) and said inductor (L) are coupled in parallel.

19. A drive circuit for an electric motor including a commutator circuit, said commutator circuit comprising a commutator bridge (1) having switches (S1, S2: 54,55) in each arm of the bridge and arranged to have a load (2) coupled to a mid-point of the bridge and a switched resonant arm (3) comprising a capacitor (C) and an inductor (L) also coupled to the mid-point of the bridge, characterised in that the commutator bridge is arranged to be switched into independent ones of only three switch states in a predetermined sequential and cyclical manner to provide controlled resonant commutation of the voltage of the mid-point of the bridge and in that said capacitor (C) and said inductor (L) are coupled in parallel.

20. A circuit according to claim 19, in which the motor is a servo motor.

21. A circuit according to claim 1, in which any one of the three switch states, only one switch (S1 to S3; 54 to 56) associated with the commutator bridge is closed.

22. A circuit according to claim 1, in which the bridge comprises three switches and in which any one of the three switch states, only one of said switches (S1 to S3; S4 to S6) associated with the commutator bridge is closed.

23. A circuit according to claim 1, in which the circuit has a full-bridge topology and wherein the switches (S1 to S3; S4 to S6) associated with a respective half of the bridge are arranged to be switched sequentially and cyclically between three switch states.

* * * * *